US011369888B2

(12) United States Patent
Gorentz (10) Patent No.: US 11,369,888 B2
(45) Date of Patent: Jun. 28, 2022

(54) MAINTENANCE SYSTEMS AND METHODS FOR A WHEEL ASSEMBLY OF AN AMUSEMENT RIDE VEHICLE

(71) Applicant: Universal City Studios LLC, Universal City, CA (US)

(72) Inventor: Lucas Anton Gorentz, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 384 days.

(21) Appl. No.: 16/709,547

(22) Filed: Dec. 10, 2019

(65) Prior Publication Data

US 2021/0170286 A1    Jun. 10, 2021

Related U.S. Application Data (60) Provisional application No. 62/944,012, filed on Dec. 5, 2019.

(51) Int. Cl.
*A63G 7/00*        (2006.01)
*A63G 21/04*      (2006.01)
(Continued)

(52) U.S. Cl.
CPC .............. *A63G 7/00* (2013.01); *A63G 21/04* (2013.01); *B60B 17/0079* (2013.01); *B61F 9/00* (2013.01);
(Continued)

(58) Field of Classification Search
CPC ...... A63G 7/00; A63G 21/04; B60B 17/0079; B60B 2320/00; B60B 2900/113;
(Continued)

(56) References Cited

U.S. PATENT DOCUMENTS 3,841,225 A    10/1974   Johnson
4,574,489 A *   3/1986   Grossart ................ G01B 5/255
                                                           33/203.18
(Continued)

FOREIGN PATENT DOCUMENTS

CN        106582034 A  *  4/2017

OTHER PUBLICATIONS

PCT/US2020/063128 International Search Report and Written Opinion dated Mar. 1, 2021.

*Primary Examiner* — Zachary L Kuhfuss
(74) *Attorney, Agent, or Firm* — Fletcher Yoder, P.C.

(57) ABSTRACT

A maintenance assembly for a wheel assembly of an amusement ride vehicle includes a foundational body, a wheel engagement section extending a first distance from the foundational body, and a datum section including a protrusion extending a second distance from the foundational body. The wheel engagement section is configured to contact a wheel surface of the wheel assembly, and the datum section is configured to contact a pad of the wheel assembly. Additionally, the wheel engagement section is rigidly positioned with respect to the datum section, and the second distance is greater than the first distance, such that the maintenance assembly provides a fixed distance between a surface of the datum section configured to contact the pad and a surface of the wheel engagement section configured to contact the wheel surface.

20 Claims, 7 Drawing Sheets

(51) Int. Cl.
  *B61F 9/00*   (2006.01)
  *B60B 17/00*  (2006.01)
  *G01B 21/26*  (2006.01)
  *G01B 5/255*  (2006.01)
  *G01B 5/00*   (2006.01)

(52) U.S. Cl.
  CPC ..... *B60B 2320/00* (2013.01); *B60B 2900/113* (2013.01); *B60B 2900/541* (2013.01); *G01B 5/0004* (2013.01); *G01B 5/255* (2013.01); *G01B 21/26* (2013.01); *G01B 2210/16* (2013.01)

(58) Field of Classification Search
  CPC ......... B60B 2900/323; B60B 2900/541; B61F 9/00; G01B 21/26; G01B 5/0004; G01B 5/255; G01B 2210/16
  See application file for complete search history.

(56) References Cited

U.S. PATENT DOCUMENTS

| | | | |
|---|---|---|---|
| 4,794,865 A |  | 1/1989 | Lindberg |
| 5,119,734 A | * | 6/1992 | Schwarzkopf ............ B61F 9/00 104/246 |
| 6,564,461 B1 | * | 5/2003 | Naruse ................... G01B 5/255 33/203.13 |
| 10,421,021 B2 | * | 9/2019 | Smith ...................... A63G 7/00 |
| 2016/0052526 A1 |  | 2/2016 | Slurink |
| 2018/0318722 A1 |  | 11/2018 | Smith et al. |

* cited by examiner

MAINTENANCE SYSTEMS AND METHODS FOR A WHEEL ASSEMBLY OF AN AMUSEMENT RIDE VEHICLE

CROSS REFERENCE TO RELATED APPLICATION

This application claims priority from and the benefit of U.S. Provisional Application Ser. No. 62/944,012 entitled "MAINTENANCE SYSTEMS AND METHODS FOR A WHEEL ASSEMBLY OF AN AMUSEMENT RIDE VEHICLE", filed Dec. 5, 2019, which is hereby incorporated by reference in its entirety.

BACKGROUND

The present disclosure relates generally to a maintenance system and method, and more particularly to a maintenance system and method for an amusement ride vehicle.

In some cases, an amusement ride may include a ride vehicle and a ride track. The ride vehicle may include wheels coupled to the ride track, such as rails of the ride track. During operation, the wheels may move along the ride track, which may cause the wheels to wear and/or to shift relative to other portions of the ride vehicle, such as other portions of a wheel assembly and/or a body of the ride vehicle. To account for the wear and shifting of the wheels, the wheels are typically adjusted while coupled to the ride track. In some cases, the ride vehicle is moved to other track(s), such as an alternate track within a maintenance area, and the wheels are adjusted while coupled to the alternate track. However, it is now recognized that adjusting the wheels while coupled to the ride track and/or to the alternate track may inhibit access to certain portions of the ride vehicle, such as portions of the wheel or portions of a wheel assembly generally. Additionally, it is now recognized that moving the ride vehicle from the ride track to the alternate ride track may be a time-intensive process that may delay maintenance of the ride vehicle.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a maintenance assembly for a wheel assembly of an amusement ride vehicle includes a foundational body, a wheel engagement section extending a first distance from the foundational body, and a datum section including a protrusion extending a second distance from the foundational body. The wheel engagement section is configured to contact a wheel surface of the wheel assembly, and the datum section is configured to contact a pad of the wheel assembly. Additionally, the wheel engagement section is rigidly positioned with respect to the datum section, and the second distance is greater than the first distance, such that the maintenance assembly provides a fixed distance between a surface of the datum section configured to contact the pad and a surface of the wheel engagement section configured to contact the wheel surface.

In an embodiment, a method of maintaining an amusement ride vehicle includes exposing a wheel of the amusement ride vehicle by positioning the wheel out of engagement with a rail, disposing a datum section extending from a foundational body of a handheld maintenance assembly against a pad coupled to the wheel, and adjusting a bushing coupled to the wheel until a wheel surface of the wheel contacts a rail section extending from the foundational body of the handheld maintenance assembly while the datum section is disposed against the pad to provide a fixed distance between the pad and the wheel surface of the wheel.

In an embodiment, a maintenance template for a wheel assembly of an amusement ride vehicle includes a foundational body having an elongate geometry defined by a length of the foundational body that is greater than a width of the foundational body, a wheel engagement section extending a first distance from an end portion of the foundational body in a direction transverse to the length of the foundational body, and a datum section including a protrusion extending a second distance from the foundational body. The wheel engagement section has a geometry corresponding to a track the wheel assembly is configured to traverse such that the wheel engagement section is configured to contact a wheel of the wheel assembly at a first contact location. Additionally, the datum section is configured to contact a pad of the wheel assembly at a second contact location. The second distance is greater than the first distance, such that an offset distance is provided between the first contact location and the second contact location.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain embodiments of the present disclosure include a maintenance system and/or method for an amusement ride vehicle. For example, the maintenance system may include a maintenance assembly (e.g., a maintenance template) for a wheel assembly of the amusement ride vehicle. The maintenance assembly may include a foundational body, a wheel engagement section extending a first distance from the foundational body, and a datum section extending a second distance from the foundational body, such that the maintenance assembly provides a fixed distance from a surface of the datum section and a surface of the wheel engagement section. The wheel engagement section may be configured to contact a wheel surface of the wheel assembly, and the datum section may be configured to contact a pad of the wheel assembly that is coupled to the wheel. The wheel of the wheel assembly may be adjusted relative to the pad, such that the maintenance assembly provides the fixed distance between the surface of the pad and the wheel surface of the wheel assembly.

As such, maintenance personnel may use the maintenance assembly to adjust the wheel assembly and maintain the fixed distance within the wheel assembly. The fixed distance may provide clearance between the pad of the wheel assembly and the ride track while the wheel assembly is coupled to and/or moves along the ride track. In this manner, a maintenance time of the wheel assembly, and the ride vehicle generally, may be reduced relative to traditional embodiments. For example, rather than moving the ride vehicle from one ride track to alternate ride track(s) to perform maintenance, the ride vehicle may be removed from the ride track, such that the wheel assembly is exposed. The maintenance assembly may be disposed within the exposed wheel assembly to allow for adjustment of the wheel and to provide the fixed distance within the wheel assembly. In some embodiments, the maintenance assembly may be a lightweight handheld maintenance assembly (e.g., between one-quarter (0.25) kilogram (kg) and twenty (20) kg) to allow maintenance personnel to easily handle and move the maintenance assembly into and out of the wheel assembly. As such, the maintenance assembly may facilitate maintenance of the wheel assembly and the ride vehicle generally. To achieve this light weight, the maintenance assembly may be fully or partially made of plastic and may include hollow features.

Figure 1:
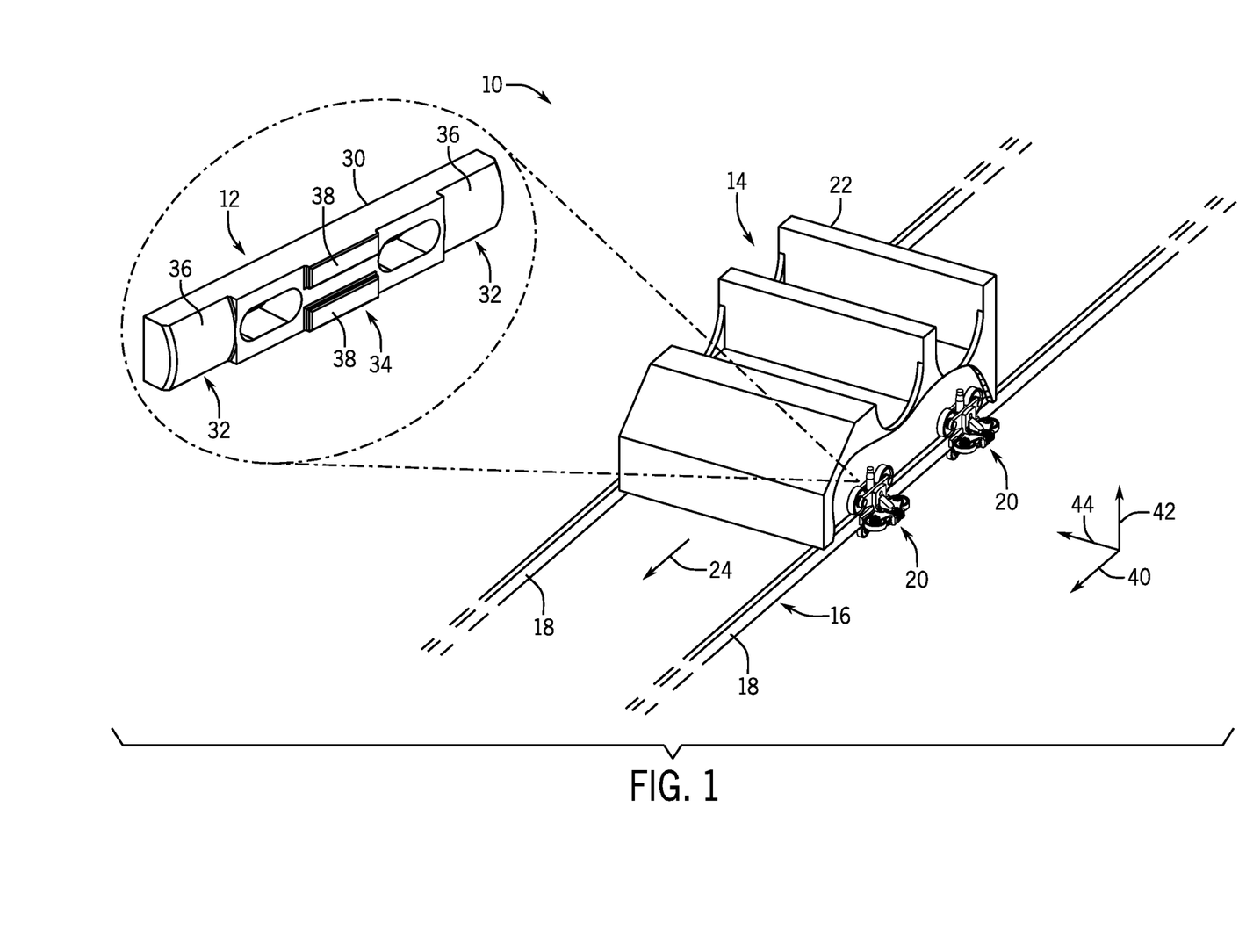
FIG. 1 is a perspective view of an embodiment of an amusement ride system having a ride vehicle and a maintenance assembly, in accordance with an aspect of the present disclosure.

With the foregoing in mind, the present embodiments relating to a maintenance system and/or method for a wheel assembly of an amusement ride vehicle may be utilized in any amusement ride or attraction system. For example, FIG. 1 is a perspective view of an embodiment of an amusement ride system 10 having a maintenance assembly 12, a ride vehicle 14 (e.g., an amusement ride vehicle), and a ride track 16. The ride vehicle 14 is coupled to rails 18 of the ride track 16. In certain embodiments, the amusement ride system 10 may include additional ride vehicles 14, and/or the ride vehicles 14 may be connected to form a train or chain of ride vehicles 14 along the ride track 16. In some embodiments, each ride vehicle 14 may be disconnected and may move independently. The ride vehicle 14 may carry guest(s) through the amusement ride system 10. For example, the amusement ride system 10 may be a roller coaster that includes the ride vehicle 14 traveling at a high speed (e.g., 50-100 mph) for the entertainment of the participant guests. In other embodiments, the amusement ride system 10 may be a slow-paced ride that includes the ride vehicle 14 traveling at a low speed (e.g., 1-30 mph).

The ride vehicle 14 includes wheel assemblies 20 (e.g., bogie assemblies) and a car 22 coupled to the wheel assemblies 20. The car 22 may be configured to carry the guests through the amusement ride system 10. As illustrated, the ride vehicle 14 includes two wheel assemblies 20 engaged with the rails 18 of the ride track 16. In certain embodiments, the ride vehicle 14 may include more or fewer wheel assemblies 20 (e.g., one wheel assembly 20, three wheel assemblies 20, four wheel assemblies 20, six wheel assemblies 20, ten wheel assemblies 20). In some embodiments, the ride track 16 may include more or fewer rails 18 (e.g., one rail 18, three rails 18, four rails 18, six rails 18). As described in greater detail with respect to FIGS. 2 and 3, the wheel assemblies 20 may include wheel(s) that allow the ride vehicle 14 to move along the rails 18, such as in a direction 24 along the ride track 16, during operation and/or maintenance of the amusement ride system 10. For example, the ride track 16 may be disposed within a ride area of the amusement ride system 10 (e.g., an area where the ride vehicle 14 is configured to carry the guests) and/or in a maintenance area of the amusement ride system 10 (e.g., an area where the ride vehicle 14, or portions thereof, may be maintained).

The wheels may be coupled to a pad of the wheel assembly 20 and may provide an offset distance (e.g., a clearance) between the pad and the rail 18 while the wheel assembly 20 is engaged with the rail 18. As the wheel assemblies 20 move along the ride track 16, such as during normal operation of the amusement ride system 10, the wheels of the wheel assemblies 20 may experience wear and/or may move relative to other portions of the wheel assemblies 20. The wear and/or relative movement of the wheels may cause the offset distance between a wheel and the pad of the wheel assembly 20 to change, thereby changing the distance/clearance between the pad and the rail 18 while the wheel assembly 20 is engaged with the rail 18.

During maintenance of the ride vehicle 14 (e.g., routine and/or periodic maintenance), some or all of the wheel assemblies 20 may be disengaged and/or removed from the rails 18, thereby exposing the wheels of the wheel assemblies 20. In certain embodiments, the ride vehicle 14 may be supported by another structure of the amusement ride system 10 while disengaged from the rails 18. The maintenance assembly 12 is configured to provide a reference/datum structure for adjusting the wheels of the wheel assembly 20 and maintaining the offset distance between the wheel and the pad of the exposed wheel assembly 20. For example, the maintenance assembly includes a foundational body 30, wheel engagement sections 32 (e.g., rail sections) coupled to and extending from the foundational body 30, and a datum section 34 coupled to and extending from the foundational body 30. The datum section 34 may extend farther from the foundational body 30 than the wheel engagement sections 32 to provide a fixed distance (e.g., a fixed lateral distance) between surfaces 36 of the wheel engagement sections 32 and a surface 38 of the datum section 34. The maintenance assembly 12 may be disposed against/within the exposed wheel assembly 20, such that one or more wheel engagement sections 32 (e.g., the surface(s) 36 of the wheel engagement sections 32) engages/contacts respective wheel (s) of the wheel assembly 20 and/or the datum section 34 (e.g., the surface 38 of the datum section 34) engages/ contacts the pad of the wheel assembly 20. In certain embodiments, only one or more wheel engagement sections 32 may contact respective wheels of the wheel assembly 20 or only the datum section 34 may contact the pad of the wheel assembly 20 (e.g., due to the wear and/or movement of the wheels relative to the pad). The wheels may be adjusted relative to the pad until both the pad and the wheels contact the maintenance assembly 12, thereby establishing/ maintaining the fixed distance within the wheel assembly 20 (e.g., between the pad and the wheels).

As illustrated, the wheel engagement sections 32 are curved to generally mimic a curved shape of the rails 18 (e.g., each wheel engagement section 32 is a rail-shaped interface). For example, each wheel engagement section 32 includes a curved face that may engage a complementary face of the wheel assembly 20. In certain embodiments, the wheel engagement sections 32 may be flat or other suitable shapes. For purposes of discussion, reference may be made to a longitudinal axis or direction 40, a vertical axis or direction 42, and a lateral axis or direction 44. For example, the direction of travel 24 of the ride vehicle 14 may be generally along the longitudinal axis 40. Additionally, the rails 18 and/or the maintenance assembly 12 (e.g., a length of the maintenance assembly 12) may extend generally along the longitudinal axis 40. The wheel engagement sections 32 and the datum section 34 extend from the foundational body 30 generally along the lateral axis 44. It should be understood that the illustrated axes 40, 42, and 44 (as set forth in the figures) are generally positioned offset from the relevant system components to facilitate viewing and understanding of directional aspects of disclosed features. However, reference to features as being positioned along or traveling along a particular axis will be understood to mean an axis generally aligned with the relevant feature and/or generally parallel to the referenced axis. Moreover, a strictly mathematical interpretation would be overly limiting as these are intended to facilitate understanding of positioning within a range or relative to other components, such as would be understood in view of system tolerances and the like.

Figure 2:
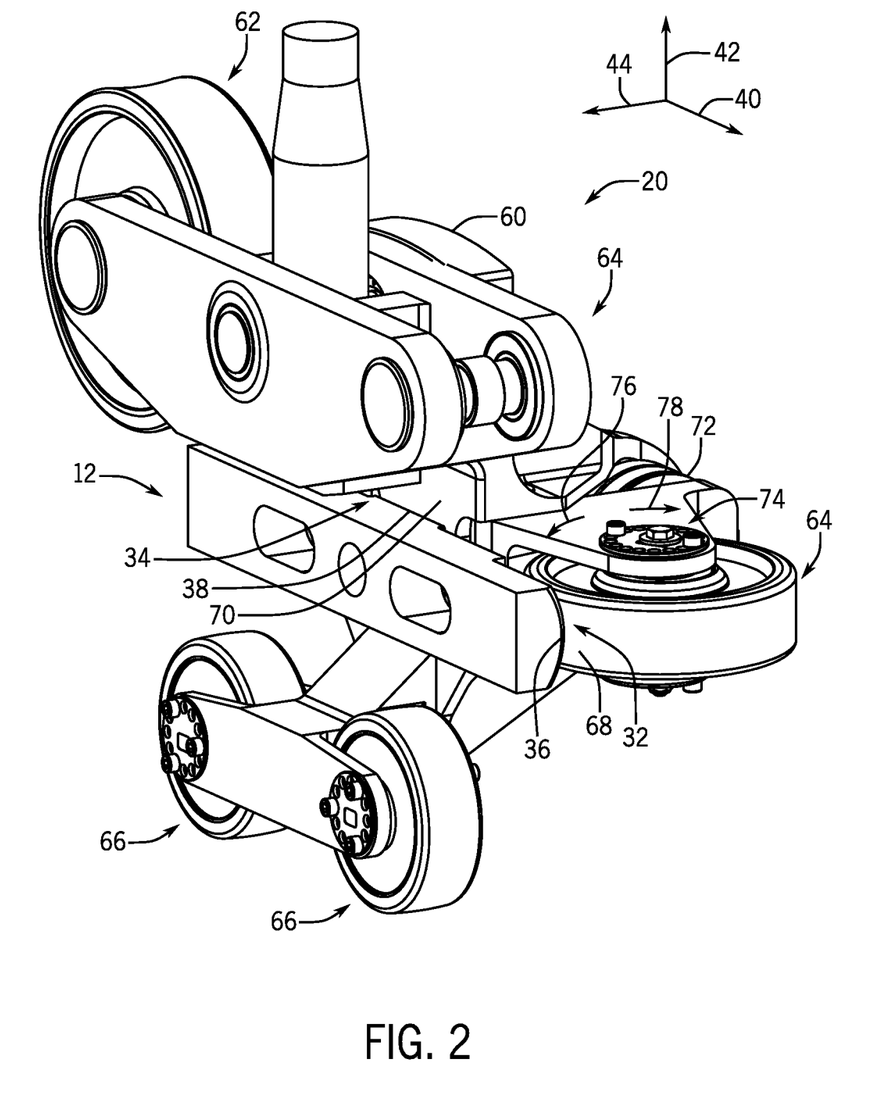
FIG. 2 is a perspective view of an embodiment of a wheel assembly and the maintenance assembly of FIG. 1 engaged with one another, in accordance with an aspect of the present disclosure.

FIG. 2 is a perspective view of an embodiment of the maintenance assembly 12 of FIG. 1 disposed against/within the wheel assembly 20. As illustrated, the wheel assembly 20 includes a body structure 60 configured to engage the car 22 of the ride vehicle 14 and/or other portions of the ride vehicle 14 of FIG. 1. Additionally, the wheel assembly 20 includes load wheels 62 coupled to the body structure 60 (one load wheel 62 is illustrated and another load wheel 62 is omitted for clarity), guide wheels 64 (e.g., side wheels) coupled to the body structure 60 (one guide wheel 64 is disposed behind the body structure 60 and is not visible), and lower wheels 66 coupled to the body structure 60. The load wheels 62 are configured to engage/contact the rail 18, bear some or all of a load of the ride vehicle 14, and at least partially restrict movement (e.g., downward movement along the vertical axis 42) of the wheel assembly 20 relative to the rail 18. The guide wheels 64 are configured to engage/contact the rail 18 and at least partially restrict movement (e.g., movement along the lateral axis 44) of the wheel assembly 20 relative to the rail 18. The lower wheels 66 are configured to engage/contact the rail 18 and at least partially restrict movement (e.g., upward movement along the vertical axis 42) of the wheel assembly 20 relative to the rail 18.

As illustrated, the maintenance assembly 12 is disposed against the wheel assembly 20. The wheel engagement sections 32 are engaged with the guide wheels 64 (e.g., the surfaces 36 of the wheel engagement sections 32 are engaged with wheel surfaces 68 of the guide wheels 64 at first contact locations). Additionally, the datum section 34 is engaged with a pad 70 (e.g., a bogie pad) of the body structure 60 that is coupled (e.g., rotatably coupled and/or adjustably coupled) to the guide wheels 64 (e.g., the surface 38 of the datum section 34 is engaged with the pad 70 at a second contact location).

As described above, the surface 36 of each wheel engagement section 32 is disposed a fixed distance (e.g., a fixed distance along the lateral axis 44) relative to the surface 38 of the datum section 34. The guide wheels 64 may be adjusted relative to the body structure 60, such that a distance (e.g., a distance along the lateral axis 44) between the wheel surfaces 68 and the pad 70 generally matches the fixed distance of the maintenance assembly 12. For example, the wear and/or relative movement of the guide wheels 64 relative to the body structure 60 may cause only the datum section 34 to engage the pad 70 or may cause only one or both wheel engagement sections 32 to engage respective guide wheels 64. As such, the guide wheels 64 may be adjusted relative to the body structure 60 to compensate for such wear and relative movement.

The wheel assembly 20 includes wheel extenders 72 coupled to the body structure 60 and to respective guide wheels 64. Each wheel extender 72 may be adjusted (e.g., retracted or extended) to move the guide wheel 64 relative to the body structure 60 and maintain the fixed distance (e.g., fixed distance along the lateral axis 44). For example, the wheel extenders 72 may include a pressurized hydraulic fluid, spring(s), a ratchet, and other suitable mechanisms configured to adjust a position of each guide wheel 64 relative to the body structure 60. Each guide wheel 64 may be rotatably coupled to the body structure 60 or otherwise coupled to the body structure 60 to allow for such adjustments.

Additionally, the wheel assembly 20 includes a bushing 74 coupled to the body structure 60 and to an axle of each guide wheel 64. Each bushing 74 may be adjusted (e.g., rotated) to move the guide wheel 64 relative to the body structure 60 and maintain the fixed distance (e.g., fixed distance along the lateral axis 44). For example, the bushings 72 may be eccentric bushings coupled to the axles of the guide wheels 64. The bushings 74 may be rotated in a first direction 76 to increase the offset distance between the guide wheel 64 and the pad 70 and in a second direction 78 to decrease the offset distance between the guide wheel 64 and the pad 70. In certain embodiments, the first direction 76 and the second direction 78 may be reversed, such that bushings 74 may be rotated in the second direction 78 to increase the offset distance between the guide wheel 64 and the pad 70 and in the first direction 76 to decrease the offset distance between the guide wheel 64 and the pad 70. The adjustments to the bushings 74 may be performed in addition to or in place of the adjustments to the wheel extenders 72 to maintain the fixed distance (e.g., fixed distance along the lateral axis 44). In certain embodiments, the wheel extenders 72 or the bushings 74 may be omitted from the wheel assembly 20.

In certain embodiments, the wheel assembly 20 may include other components and/or surfaces coupled to the guide wheels 64, such that the guide wheels 64 may be adjusted relative the other components/surfaces to provide the offset distance. For example, the other component may be a bracket of the maintenance assembly 12 or another suitable component/surface. The datum section 34 of the maintenance assembly 12 may be used to adjust the guide wheels 64 relative to the other component/surface to provide the offset distance between the guide wheels 64 and the other component/surface.

While the maintenance assembly 12 is described herein as providing a reference/datum structure for maintenance and adjustment of the guide wheels 64, the maintenance assembly 12 or another suitable maintenance assembly may be used for adjustments of the load wheels 62 and/or the lower wheels 66. The load wheels 62 and/or the lower wheels 66 may also wear and/or rotate relative to the body structure 60, and the maintenance assembly 12 may be used to adjust the load wheels 62 and/or the lower wheels 66 to compensate for such wear and relative rotation. For example, as described in greater detail below in reference to FIG. 7, the maintenance assembly 12 may include extender(s) configured to adjust the fixed distance between the surface 36 of each wheel engagement section 32 and the surface 38 of the datum section 34.

Figure 3:
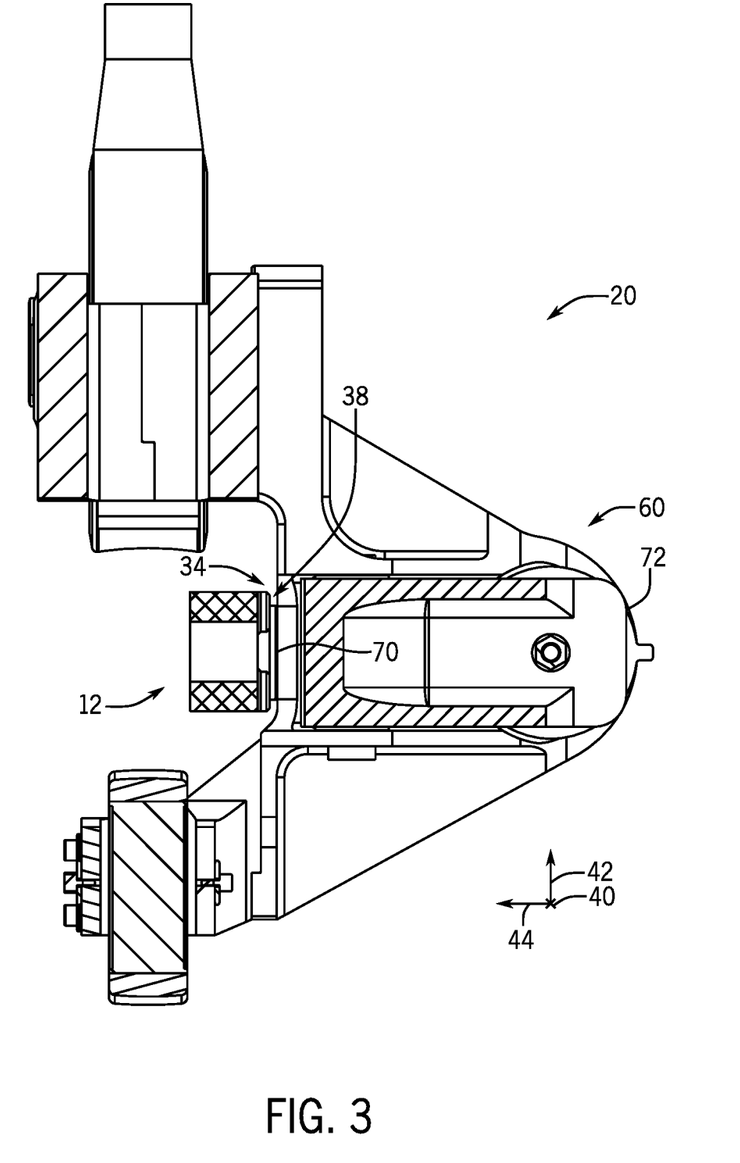
FIG. 3 is a side cross-sectional view of an embodiment of the maintenance assembly disposed within the wheel assembly of FIG. 2, in accordance with an aspect of the present disclosure.

FIG. 3 is a side cross-sectional view of an embodiment of the maintenance assembly 12 disposed against the wheel assembly 20 of FIG. 2. As illustrated, the surface 38 of the datum section 34 is engaged with the pad 70 of the body structure 60 of the wheel assembly 20. As described above, the wheel extenders 72 and/or the bushings 74 of the wheel assembly 20 may be adjusted until both the datum section 34 is engaged with the pad 70 and the wheel engagement sections 32 are engaged with the guide wheels 64 to provide the fixed lateral distance between the guide wheels 64 and the pad 70.

Figure 4:
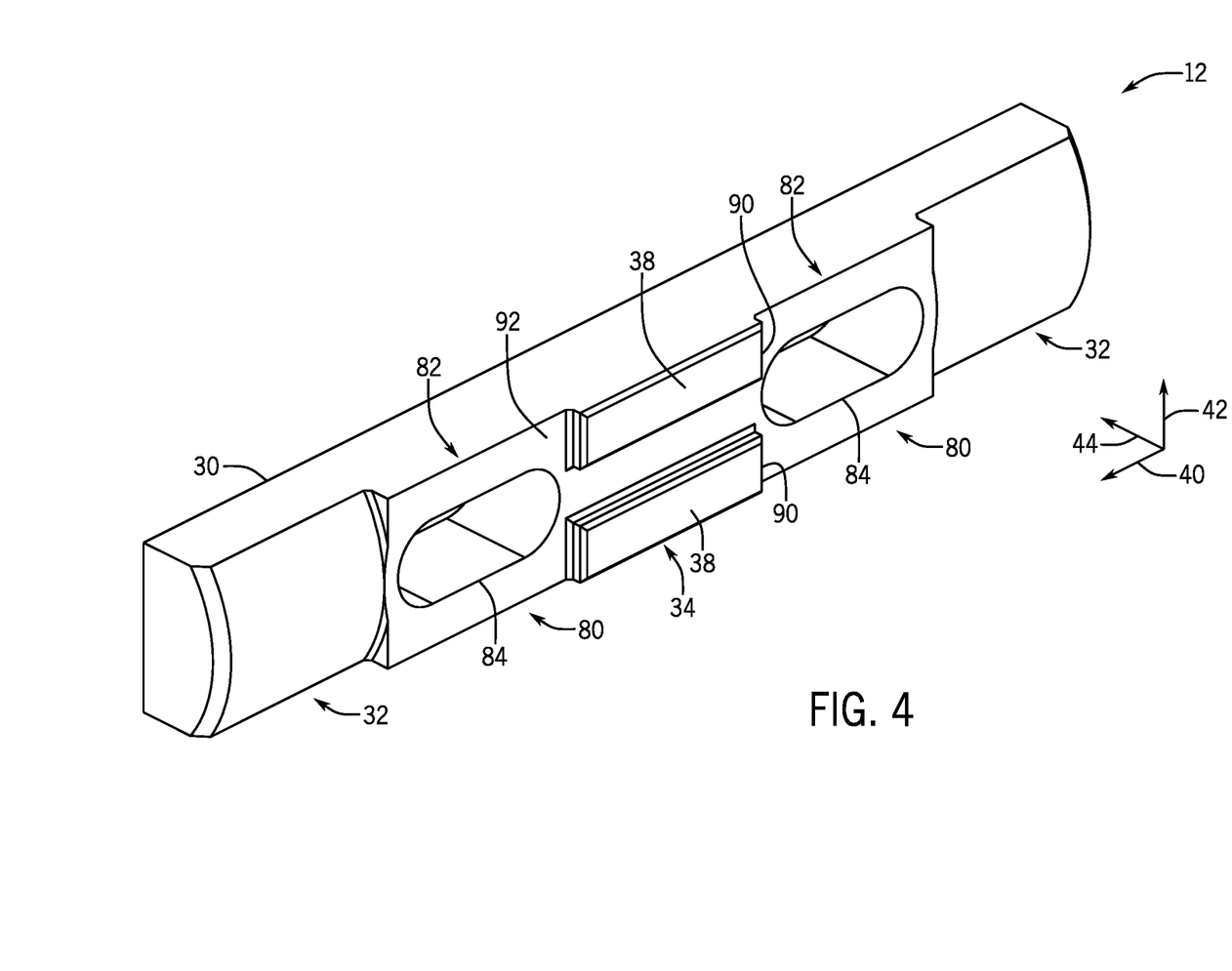
FIG. 4 is a perspective view of an embodiment of the maintenance assembly of FIG. 1, in accordance with an aspect of the present disclosure.

FIG. 4 is a perspective view of an embodiment of the maintenance assembly 12 of FIG. 1. The maintenance assembly 12 includes a grip section 80 disposed between each wheel engagement section 32 and the datum section 34 (e.g., two grip sections 80). In certain embodiments, the maintenance assembly 12 may include more or fewer grip sections 80 (e.g., one grip section 80, three grip sections 80, four grip sections 80). Each grip section 80 is configured to allow a user to hold, move, grip, maneuver, and/or place the maintenance assembly 12. For example, each grip section 80 includes a handle 82 formed by a hole 84 (e.g., a passage) extending through the maintenance assembly 12 (e.g., through the foundational body 30) along the lateral axis 44. The user may extend their hand, a portion of their hand, and/or a tool through the hole 84 of the handle 82 to grip the grip section 80 (e.g., to grip one or both grip sections 80). In the illustrated embodiment, each hole 84 extends through the maintenance assembly 12. In some embodiments, one or both holes 84 may extend only partially into the maintenance assembly 12 (e.g., along the lateral axis 44). In certain embodiments, one or both holes 84 may be omitted, and the user may grip the grip sections 80 by wrapping their hands around the maintenance assembly 12 at the grip sections 80. In some embodiments, one or both grip sections 80 may include other handles, such as protrusions extending laterally from the foundational body 30 on a side of the maintenance assembly 12 generally opposite the wheel engagement sections 32 and the datum section 34 (e.g., a backside of the maintenance assembly 12). In one embodiment, a handle may extend from one side of one or both of the holes 84 to a respective other side of the one or both holes 84.

The datum section 34 includes two protrusions 90 extending from a face 92 of the maintenance assembly 12 (e.g., a face disposed along/within the datum section 34). The surfaces 38 (e.g., the surfaces 38 configured to engage/contact the pad 70 of the wheel assembly 20) are disposed on respective protrusions 90. In certain embodiments, the datum section 34 may include more or fewer protrusions 90 (e.g., one protrusion 90, three protrusions 90, four protrusions 90). Additionally, each protrusion 90 is generally rectangular, and a length of each protrusion 90 extends generally along the longitudinal axis 40. In other embodiments, one or more protrusions 90 may be shaped differently than the illustrated embodiment.

As described above, the maintenance assembly 12 may be lightweight to allow maintenance personnel to easily handle and move the maintenance assembly into and out of the wheel assembly. For example, the maintenance assembly 12 may weigh between one-quarter (0.25) kg and one hundred (100.0) kg, between one-quarter (0.25) kg and twenty (20.0) kg, between one (1.0) kg and fifteen (15.0) kg, or other suitable weights. Additionally, the maintenance assembly 12 may be integrally formed as a unified structure (e.g., each of the foundational body 30, the wheel engagement sections 32, the datum section 34, and the grip sections 80 may be integrally formed as a unified structure). For example, the maintenance assembly 12 may be a molded structure (e.g., formed via a molding process) or another suitable structure formed by another suitable process. In certain embodiments, each of the foundational body 30, the wheel engagement sections 32, the datum section 34, and the grip sections 80 may be rigidly coupled/connected to one another. For example, the datum section 34 may be rigidly disposed between the wheel engagement sections 32.

Figure 5:
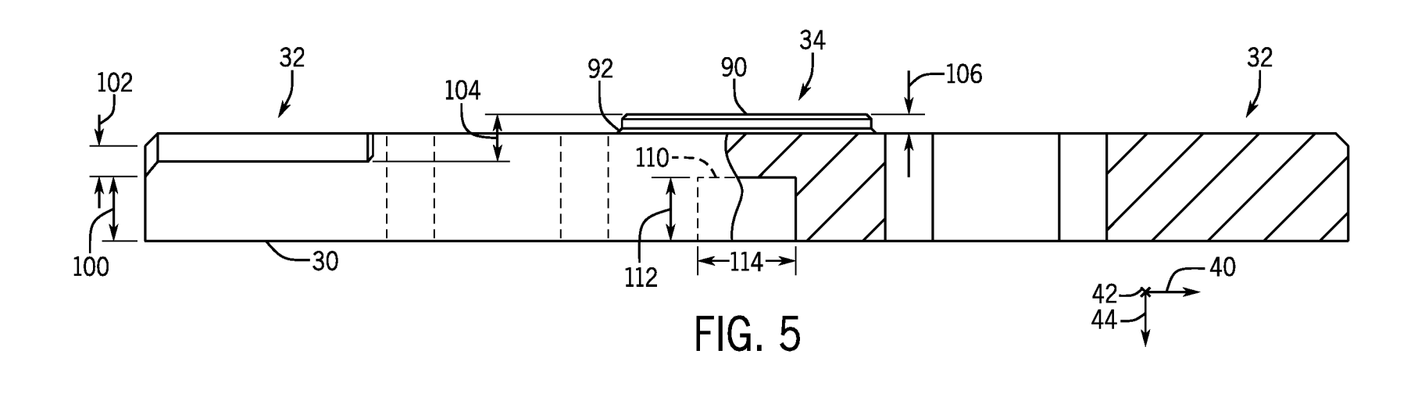
FIG. 5 is a side view of an embodiment of the maintenance assembly of FIG. 1, in accordance with an aspect of the present disclosure.

FIG. 5 is a side view of an embodiment of the maintenance assembly 12 of FIG. 1. As illustrated, the foundational body 30 of the maintenance assembly 12 extends a distance 100 along the lateral axis 44. The distance 100 may be fifty (50.0) millimeters (mm), between ten (10.0) mm and one hundred (100.0) mm, or other suitable distances. In addition, each wheel engagement section 32 extends a distance 102 from the foundational body 30 along the lateral axis 44 (e.g., transverse to a length of the foundational body 30). The distance 102 may be ten (10.0) mm, between four (4.0) mm and thirty (30.0) mm, between six (6.0) mm and twenty (20.0) mm, or other suitable distances. Further, the datum section 34 extend a distance 104 from the foundational body 30 along the lateral axis 44 (e.g., transverse to a length of the foundational body 30). The distance 104 may be fifteen (15.0) mm, between ten (10.0) mm and forty (40.0) mm, or other suitable distances. In certain embodiments, the distance 102 may be greater than the distance 104, such that the datum section 34 extends further from the foundational body 30 than the wheel engagement sections 32, and a difference between the distance 102 and the distance 104 is generally equal to the fixed distance to be implemented between the guide wheels 64 and the pad 70 of the wheel assembly 20.

In some embodiments, a difference between the distance 102 and the distance 104 may be generally equal to a distance 106 that the protrusions 90 extend from the face 92 of the maintenance assembly 12 (e.g., a height/length of the protrusions 90). For example, the face 92 may also extend the distance 102 from the foundational body 30, such that at least a portion of the surface 36 of each wheel engagement section 32 and the face 92 form a continuous surface along the maintenance assembly 12.

As illustrated, the maintenance assembly includes a receptacle 110 extending into the foundational body 30 along the lateral axis 44 and generally opposite the datum section 34. The receptacle 110 may be configured to receive a clamp to secure the maintenance assembly 12 to the wheel assembly 20. For example, a first part of the clamp may be disposed in and/or secured to the receptacle 110, and a second part of the clamp may be secured to the body structure 60 of the wheel assembly 20. As such, the receptacle 110 allows the maintenance assembly 12 to be securely attached to the wheel assembly during maintenance operations, such as during adjustments of the guide wheels 64. The receptacle extends a distance 112 into the foundational body 30. The distance 112 may be twenty-five (25.0) mm, between fifteen (15.0) mm and forty (40.0) mm, or other suitable distances. Additionally, a diameter 114 of the receptacle 110 along the longitudinal axis 40 may be forty (40.0) mm, between twenty (25.0) mm and sixty (60.0) mm, or other suitable diameters.

Figure 6:
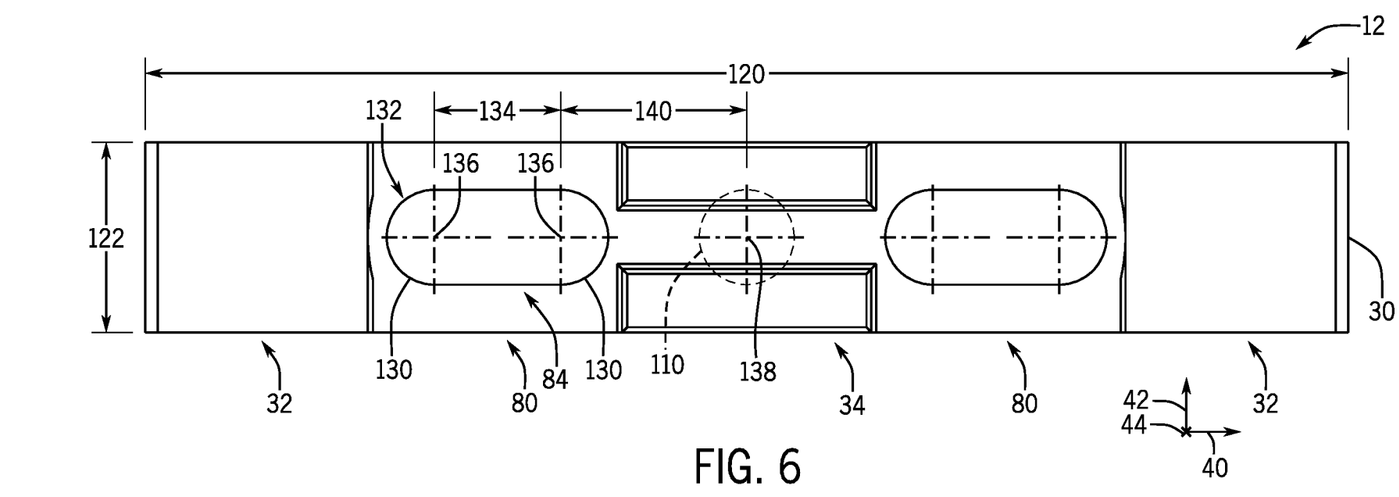
FIG. 6 is a top view of an embodiment of the maintenance assembly of FIG. 1, in accordance with an aspect of the present disclosure.

FIG. 6 is a top view of an embodiment of the maintenance assembly 12 of FIG. 1. The foundational body 30, and the maintenance assembly 12 generally, extends a distance 120 (e.g., a length) along the longitudinal axis 40. The distance 120 may be forty-eight (25.0) centimeters (cm), between twenty (20.0) cm and one hundred (100.0) cm, or other suitable distances. Additionally, the foundational body 30, and the maintenance assembly 12 generally, extends a distance 122 (e.g., a width) along the vertical axis 42. The distance 122 may be seventy-six (76.0) mm, between fifty (50.0) mm and one hundred (100.0) mm, or other suitable distances. As such, the foundational body 30 includes an elongate geometry defined by a length (e.g., the distance 120) that is greater than a width (e.g., the distance 122). In certain embodiments, the distance 120 may be greater than the distance 122, such that the distance 120 is the width of the maintenance assembly 12, and the distance 122 is the length of the maintenance assembly 12.

In addition, each hole 84 of each grip section 80 includes semi-circles 130 that are connected to form the holes 84. A radius 132 of each semi-circle 130 may be nineteen (19.0) mm, between ten (10.0) mm and forty (40.0) mm, or other suitable radii. Additionally, a distance 134 between a center 136 of each semi-circle 130 may be fifty (50.0) mm, between thirty (30.0) and seventy (70.0) mm, or other suitable distances. Further, the center 136 of the semi-circle 130 closest to the receptacle 110 is offset from a center 138 of the receptacle 110 by a distance 140. The distance 140 (e.g., an offset distance) may be seventy-five (75.0) mm, between fifty (50.0) mm and one hundred (100.0) mm, or other suitable distances. The distance 140 may facilitate handling of the maintenance assembly 12 (e.g., at the grip sections 80) while clamping the maintenance assembly 12 to the wheel assembly 20 (e.g., at the receptacle 110). For example, the distance 140 may allow a user to both hold the maintenance assembly 12, such as against the wheel assembly 20, while clamping the maintenance assembly 12 to the wheel assembly 20.

Figure 7:
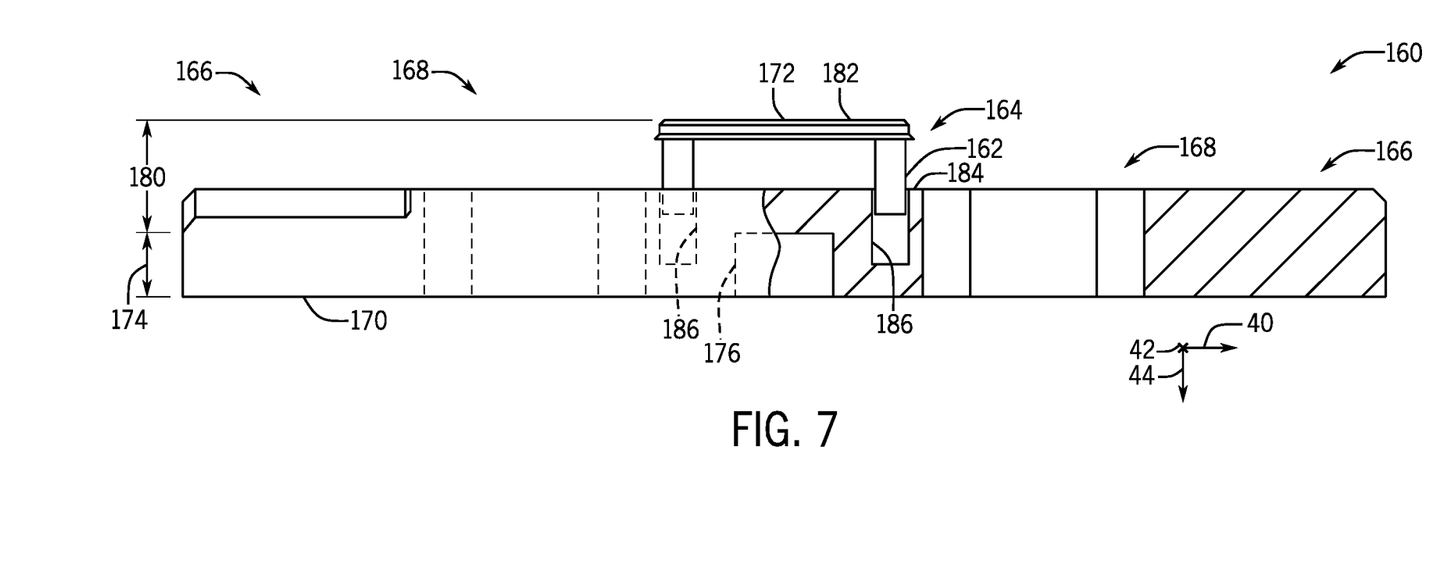
FIG. 7 is a side view of an embodiment of a maintenance assembly with extenders in an extended position, in accordance with an aspect of the present disclosure.

FIG. 7 is a side view of an embodiment of a maintenance assembly 160 with extenders 162 of a datum section 164 in an extended position. As illustrated, the maintenance assembly 160 includes the datum section 164 configured to engage the pad 70 of the wheel assembly 20, wheel engagement sections 166 (e.g., rail sections) configured to engage the guide wheels 64 of the wheel assembly 20, and grip sections 168 disposed between the datum section 164 and each wheel engagement section 166. The extenders 162 are coupled to a foundational body 170 of the maintenance assembly 160 and to protrusions 172. The protrusions 172 may be configured to engage/contact the pad 70 of the wheel assembly 20. In certain embodiments, the extenders 162 may couple the datum section 164 to the foundational body 170 (e.g., the datum section 164 may include the protrusions 172, and the extenders 162 may be omitted from the datum section 164). As illustrated, the foundational body extends a distance 174 along the lateral axis 44. Additionally, the maintenance assembly 160 includes a receptacle 176 configured to receive a clamp for securing the maintenance assembly 160 to the wheel assembly 20.

Each extender 162 may be adjustable (e.g., configured to move) along the lateral axis 44 and relative to the foundational body 170 to adjust a distance 180 (e.g., an offset distance) between a surface 182 of the protrusions 172 and the foundational body 170. For example, the distance 180 may be adjusted based on actuation of the extenders 162 within apertures 186 formed along/within the datum section 164 and/or along/within the foundational body 170. In certain embodiments, each extender 162 may be a screw coupled to the foundational body 170 and the protrusions 172, such that the extenders 162 are configured to rotate (e.g., screw into or out of the foundational body 170 or the protrusions 172) to adjust the distance 180. Additionally or alternatively, the extenders 162 may include other mechanisms configured to provide adjustments to the distance 180, such as a pressurized hydraulic fluid, spring pins configured to engage slots disposed laterally along the foundational body 170, and other suitable mechanisms. The extenders 162 may be adjustable to adjust the distance 180 between ten (10.0) mm and ten (10.0) cm, between twenty (20.0) mm and fifty (50.0) mm, or other suitable distances. Further, markings may be provided on visible portions of the extenders 162 to indicate extension distances to facilitate configuration at desired extension distances. As illustrated, the maintenance assembly 160 includes two extenders 162. In other embodiments, the maintenance assembly 160 may include more or fewer extenders 162 (e.g., one extender 162, three extenders 162, four extenders 162).

The adjustable distance 180 allows the maintenance assembly 160 to be used for multiple/different wheels of a wheel assembly. For example, as described above, the wheel assembly 20 includes the load wheels 62, the guide wheels 64, and the lower wheels 66. Each of the load wheels 62, the guide wheels 64, and the lower wheels 66 may be offset from a respective pad of the body structure 60 by a different distance. As such, the extenders 162 of the maintenance assembly 160 may be adjusted to change the distance 180, such that the distance 180 matches the offset distance for any of the load wheels 62, the guide wheels 64, the lower wheels 66, and/or other suitable wheels of an amusement ride vehicle, thereby facilitating maintenance adjustments for such wheels.

Figure 8:
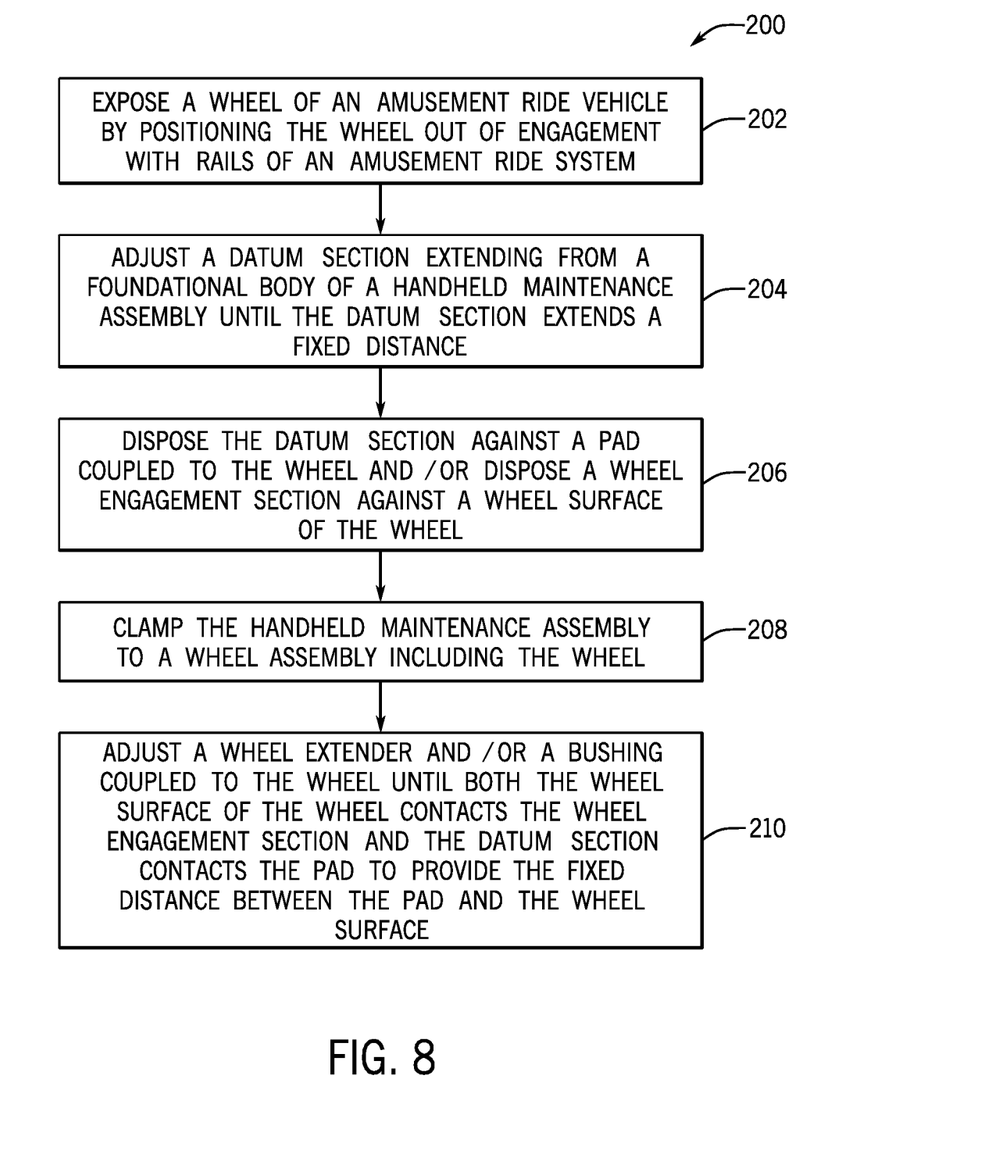
FIG. 8 is a flow chart of an embodiment of a process for maintaining the ride vehicle of FIG. 1, in accordance with an aspect of the present disclosure.

FIG. 8 is a flow chart of an embodiment of a process 200 for maintaining the ride vehicle 14 of FIG. 1. The illustrated process 200 is merely provided as an example, and in other embodiments, certain illustrated steps of the process 200 may be performed in other orders, skipped, or repeated, in accordance with the present disclosure.

As illustrated, in process block 202, a wheel of the ride vehicle 14 is exposed by positioning the wheel out of engagement with the rails 18 of the amusement ride system 10. For example, the ride vehicle 14 may be moved from the rails 18 to another support structure that may support the ride vehicle 14. The exposed wheels may include the load wheels 62, the guide wheels 64, and/or the lower wheels 66 of the wheel assembly 20. Some of all of the wheel assemblies 20 may be exposed (e.g., disengaged from the rails 18).

In process block 204, a datum section of a maintenance assembly extending from a foundational body of the maintenance assembly is adjusted relative to the foundational body until the datum section extends a fixed distance from the foundational body. For example, the extenders 162 of the maintenance assembly 160 may be adjusted until the distance 180 (e.g., the lateral distance between the foundational body 170 and the surface 182 of the protrusions 172) extends a fixed/particular distance. The fixed distance may be based on a type of wheel to be adjusted. For example, the fixed distance may be different for the load wheels 62, the guide wheels 64, and/or the lower wheels 66 of the wheel assembly 20.

In process block 206, the datum section of the maintenance assembly is disposed against a pad coupled to the wheel of the wheel assembly, and/or a wheel engagement section of the maintenance assembly is disposed against a wheel surface of the wheel. For example, the datum section 34 of the maintenance assembly 12 may be disposed against the pad 70 coupled to the guide wheels 64 of the wheel assembly 20, and/or the wheel engagement sections 32 of the maintenance assembly 12 may be disposed against the wheel surfaces 68 of the guide wheels 64. Alternatively, the datum section 164 of the maintenance assembly 160 may be disposed against the pad 70 coupled to the guide wheels 64 of the wheel assembly 20, and/or the wheel engagement sections 166 of the maintenance assembly 166 may be disposed against the wheel surfaces 68 of the guide wheels 64. In certain embodiments, the datum section 34 of the maintenance assembly 12 or the datum section 164 of the maintenance assembly 160 may be disposed against a pad of the body structure 60 coupled to the load wheels 62 or to the lower wheels 66, and/or the datum section 34 of the maintenance assembly 12 or the datum section 164 of the maintenance assembly 160 may be disposed against the load wheels 62 or the lower wheels 66.

In process block 208, the maintenance assembly is clamped to the wheel assembly. For example, the clamp may be inserted into the receptacle 110 of the maintenance assembly 12 or the receptacle 176 of the maintenance assembly 160 to secure the maintenance assembly 12 or the maintenance assembly 160 to the wheel assembly 20.

In process block 210, a wheel extender and/or a bushing coupled to the wheel is adjusted until both the wheel surface of the wheel contacts the wheel engagement section and the datum section contacts the pad to provide the fixed lateral distance between the pad and the wheel surface. For example, the wheel extenders 72 coupled to the guide wheels 64 may be adjusted until both the pad 70 contacts/engages the datum section 34 of the maintenance assembly 12 and the wheel surfaces 68 of the guide wheels 64 contact/engage the wheel engagement sections 32 of the maintenance assembly 12. In certain embodiments, the wheel extenders 72 coupled to the guide wheels 64 may be adjusted until both the pad 70 contacts/engages the datum section 164 of the maintenance assembly 160 and the wheel surfaces 68 of the guide wheels 64 contact/engage the wheel engagement sections 166 of the maintenance assembly 160. As such, the wheel extenders 72 may be adjusted, using the maintenance assembly 12 and/or the maintenance assembly 160, to provide the fixed lateral distance between the pad 70 and the guide wheels 64.

Additionally or alternatively, the bushings 74 coupled to the guide wheels 64 may be adjusted (e.g., rotated) until both the pad 70 contacts/engages the datum section 34 of the maintenance assembly 12 and the wheel surfaces 68 of the guide wheels 64 contact/engage the wheel engagement sections 32 of the maintenance assembly 12. In certain embodiments, the bushings 74 coupled to the guide wheels 64 may be adjusted until both the pad 70 contacts/engages the datum section 164 of the maintenance assembly 160 and the wheel surfaces 68 of the guide wheels 64 contact/engage the wheel engagement sections 166 of the maintenance assembly 160. As such, the bushings 74 may be adjusted, using the maintenance assembly 12 and/or the maintenance assembly 160, to provide the fixed lateral distance between the pad 70 and the guide wheels 64. The process 200, or certain steps thereof, may be repeated for each wheel or set of wheels of the wheel assembly 20.

Accordingly, the maintenance assembly 12 and the maintenance assembly 160 of the amusement ride system 10 of FIG. 1 facilitate maintenance of the wheel assemblies 20 of the ride vehicle 14. For example, the maintenance assembly 12 and the maintenance assembly 160 may be disposed against the wheel assembly 20, and the wheel extenders 72 and/or the bushings 74 of the wheel assembly 20 may be adjusted to adjust positions of the guide wheels 64. Such adjustments to the guide wheels 64 may compensate for wear and/or rotation of the guide wheels 64 that may occur during operation and/or during maintenance of the amusement ride system 10. Additionally, the maintenance assembly 12 and the maintenance assembly 160 may be lightweight and compact, such that each may be a handheld assembly that is easily maneuverable by a user. As such, the maintenance assembly 12 and the maintenance assembly 160 may facilitate maintenance of the ride vehicle 14 and may reduce a maintenance time of the ride vehicle 14.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A maintenance assembly for a wheel assembly of an amusement ride vehicle, the maintenance assembly comprising:
  a foundational body;
  at least one wheel engagement section extending a first distance from the foundational body, wherein each wheel engagement section of the at least one wheel engagement section is configured to contact a respective wheel surface of the wheel assembly; and
  a datum section comprising a protrusion extending a second distance from the foundational body and configured to contact a pad of the wheel assembly, wherein the at least one wheel engagement section is rigidly positioned with respect to the datum section and the second distance is greater than the first distance, such that the maintenance assembly provides a fixed distance between a surface of the datum section configured to contact the pad and a surface of the at least one wheel engagement section configured to contact the respective wheel surface.

2. The maintenance assembly of claim 1, wherein the at least one wheel engagement section comprises a first rail-shaped interface configured to contact a first wheel and a second rail-shaped interface configured to contact a second wheel, and wherein the datum section is rigidly disposed between the first rail-shaped interface and the second rail-shaped interface.

3. The maintenance assembly of claim 1, comprising a grip section disposed between the datum section and each wheel engagement section of the at least one wheel engagement section, wherein the grip section comprises a handle configured to enable a user to hold and place the maintenance assembly.

4. The maintenance assembly of claim 3, wherein the handle comprises a hole extending into or through the foundational body.

5. The maintenance assembly of claim 1, wherein the datum section comprises a receptacle extending partially into the foundational body from a side of the foundational body that is opposite to a side of the foundational body from which the protrusion extends, and wherein the receptacle is configured to receive a clamp to secure the maintenance assembly to the wheel assembly of the amusement ride vehicle.

6. The maintenance assembly of claim 1, wherein the first distance is between six (6.0) millimeters and twenty (20.0) millimeters.

7. The maintenance assembly of claim 1, wherein the second distance is between ten (10.0) millimeters and forty (40.0) millimeters.

8. The maintenance assembly of claim 1, wherein the maintenance assembly weighs between one-quarter (0.25) kilogram and twenty (20.0) kilograms.

9. A method of maintaining an amusement ride vehicle, the method comprising:
  exposing a wheel of the amusement ride vehicle by positioning the wheel out of engagement with a rail;
  disposing a datum section extending from a foundational body of a handheld maintenance assembly against a pad coupled to the wheel; and
  adjusting a bushing coupled to the wheel until a wheel surface of the wheel contacts a rail section extending from the foundational body of the handheld maintenance assembly while the datum section is disposed against the pad to provide a fixed distance between the pad and the wheel surface of the wheel.

10. The method of claim 9, comprising clamping the handheld maintenance assembly to a wheel assembly of the amusement ride vehicle, wherein the wheel assembly comprises the wheel.

11. The method of claim 10, comprising inserting a portion of a clamp into a receptacle disposed on an opposite side of the foundational body of the handheld maintenance assembly from the datum section.

12. The method of claim 9, comprising adjusting the datum section relative to the foundational body until the datum section extends the fixed distance from the foundational body.

13. A maintenance template for a wheel assembly of an amusement ride vehicle, the maintenance template comprising:
  a foundational body comprising an elongate geometry defined by a length of the foundational body that is greater than a width of the foundational body;
  a wheel engagement section extending a first distance from at least one end portion of the foundational body in a direction transverse to the length of the foundational body, wherein the wheel engagement section has a geometry corresponding to a track that the wheel assembly is configured to traverse, such that the wheel engagement section is configured to contact at least one wheel of the wheel assembly at a first contact location; and
  a datum section comprising a protrusion extending a second distance from the foundational body and configured to contact a pad of the wheel assembly at a second contact location, wherein the second distance is greater than the first distance, such that an offset distance is provided between the first contact location and the second contact location.

14. The maintenance template of claim 13, wherein the wheel engagement section comprises two rail sections rigidly coupled to the datum section, and wherein the datum section extends between the two rail sections.

15. The maintenance template of claim 13, comprising a passage extending into or through the maintenance template in a space between the datum section and the wheel engagement section to facilitate gripping and maneuvering the maintenance template.

16. The maintenance template of claim 13, comprising a receptacle in the foundational body through a side of the foundational body opposite a side from which the datum section extends, wherein the receptacle is configured to receive a clamp to secure the maintenance template to the wheel assembly of the amusement ride vehicle.

17. The maintenance template of claim 13, wherein the wheel engagement section has a curved face configured to engage with a complementary face of the at least one wheel.

18. The maintenance template of claim 13, wherein the foundational body, the wheel engagement section, and the datum section are integrally formed into a unified structure.

19. The maintenance template of claim 18, wherein the unified structure is a molded structure.

20. The maintenance template of claim 13, comprising an extender coupling the datum section to the foundational body, wherein the offset distance is adjustable based on actuation of the extender.

* * * * *